United States Patent [19]

Ohlaug

[11] 4,405,117

[45] Sep. 20, 1983

[54] GUIDING ATTACHMENT FOR A CUTTING TORCH

[76] Inventor: Raymond O. Ohlaug, 23033 Oxnard St., Woodland Hills, Calif. 91367

[21] Appl. No.: 305,973

[22] Filed: Sep. 28, 1981

[51] Int. Cl.³ .............................................. B23K 7/10
[52] U.S. Cl. ...................................... 266/66; 266/67; 266/76; 266/77; 269/1
[58] Field of Search ...................... 266/66, 67, 76, 77; 269/1

[56] References Cited

U.S. PATENT DOCUMENTS

| | | | |
|---|---|---|---|
| 932,740 | 8/1909 | Wiss | 266/66 |
| 1,139,048 | 5/1915 | Messer | 266/66 |
| 2,602,412 | 7/1952 | Gerlach | 266/66 |

*Primary Examiner*—W. Stallard
*Attorney, Agent, or Firm*—W. Edward Johanson

[57] ABSTRACT

The present invention is a guiding attachment for use in combination with a cutting torch which includes a nozzle which has a truncated conical tip portion and a cylindrical portion, an elongated member mechanically coupled to the nozzle and a gas supplying device for supplying gas to the nozzle which is mechanically coupled to the elongated member and a handle which is mechanically coupled to the elongated member. The guiding attachment includes a cylindrical member which has a bore into which the nozzle is placed and a pair of metal axial rods which are mechanically coupled to the cylindrical body. The guiding attachment also includes a pair of metal wheels, each of which is rotatably coupled to one of the metal axial rods and a coupling device which is a wing nut which is threadedly coupled to the cylindrical member and which couples the cylindrical portion of the nozzle of the cutting torch to the cylindrical member.

2 Claims, 2 Drawing Figures

GUIDING ATTACHMENT FOR A CUTTING TORCH

BACKGROUND OF THE INVENTION

1. Field of the Invention

The present invention relates to an attachment for supporting the tip of a cutting torch in desired relation to the workpiece and more particularly to an attachment which enables the user of the cutting torch to guide it with only one hand.

2. Description of the Prior Art

U.S. Pat. No. 4,273,313, entitled Guide for a Cutting Torch, issued to John M. DeNardo on June 16, 1981, teaches a guide which is adapted to be mounted on and selectively held to the nozzle marginal end portion of a cutting torch and which is used in association with a straight-edge for guiding the movement of the cutting torch along a workpiece. The guide includes a member having an upper surface, a lower surface and a side surface and also having a through passage communicating the upper and lower surface in order to accommodate passage of the nozzle marginal end portion. The surface of the member forming a wall of the passage is tapered inwardly toward the lower surface which is configured as a convex cam in one direction and is adapted to slidably engage the straight-edge whereby the cutting torch may be tilted to vary the spacing of the nozzle from the workpiece.

U.S. Pat. No. 4,283,043, entitled Cutting Torch Attachment, issued to Alan Kalian on Aug. 11, 1981, teaches an attachment for supporting the tip of a cutting torch in desired relation to the workpiece during a variety of cutting operations. The attachment includes an elongated bar of uniform cross-section and a clamping member which is secured at one of the bar and is adapted for clamping engagement onto a variety of burning tips for cutting torches of different sizes and shapes. The attachment also includes a support member which is mounted on the bar for adjustable positioning therealong and having an upwardly extending portion which is adapted for receiving the parallel gas supply tubes of the cutting torch which has its burning tip clamped in the clamping member and a positioning member which is vertically adjustable on the upwardly extending portion and is formed to bear against and support the lower gas supply tube of the cutting torch. The attachment further includes a rotatable wheel which has an upwardly extending post engaged with the lower end of the support member and formed for selective spacing of the rotatable wheel from the bar and for selective rotative positioning of the plane of the rotatable wheel about the axis of the post and a centering point device which has a downwardly directed point on a vertically extending shank which is carried by a keeper formed for adjustable positioning along the bar whereby vertical movement of the shank in the keeper and the post in the support member adjustably positions the spacing and angle of the burning tip with respect to the bar.

U.S. Pat. No. 4,202,535, entitled Control Device for Cutting Torch, issued to Allan Eriksson on May 13, 1980, teaches a guide assembly for controlling the movement of a cutting torch relative to a workpiece which is positioned adjacent to the guide assembly.

U.S. Pat. No. 3,174,736, entitled Carriage for Cutting Torches, issued to Elbert H. Cameron on Mar. 23, 1965, teaches a torch carriage which includes a top plate which has casters mounted on it to facilitate movement of the torch carriage over a work piece.

U.S. Pat. No. 3,396,957, entitled Cutting Torch Mount, issued to Edwin C. Rowland on Aug. 13, 1968 teaches a cutting torch mount which permits more accurate cutting through utilization of a drive wheel which engages the work piece in centered relation to the drive shaft axis.

U.S. Pat. No. 3,514,090, entitled Attachment for Cutting Torches, issued to Donald L. Richards on May 26, 1970 teaches a guiding attachment for a cutting torch.

U.S. Pat. No. 4,014,528, entitled Gas Cutting Machine, issued to Noboru Sugiyama, Yoshitugu Watanabe and Hiroshi Yamamoto on Mar. 29, 1977 teaches a gas cutting machine for cutting a steel plate which includes a wheel which is mounted on a bracket.

U.S. Pat. No. 4,173,333, entitled Variable Design Torch Guide, issued to Dennis Wise on Nov. 6, 1979 teaches a variable degree guide for a gas cutting torch.

U.S. Pat. No. 3,698,701, entitled Cutting Torch Tip Guide, issued to Richard K. Straub on Oct. 17, 1972 teaches a cutting torch tip guide for supporting, lifting, lowering and angling the flame of a cutting torch.

All of the above patents teach relative complicated guiding attachments for cutting torches which have a number of mechanical components which must be maintained.

SUMMARY OF THE INVENTION

In view of the foregoing factors and conditions which are characteristic of the prior art it is the primary object of the present invention to provide a guiding attachment for a cutting torch which enables a user of the cutting torch to guide it along a drawn line while using only one end instead of two hands as it required when he is unable to use a straight-edge.

It is another object of the present invention to provide a guiding attachment for a cutting torch which is of a simple mechanical design and has few movable components so that it may be manufactured at lower costs than the a guding attachment of more complicated mechanical design.

In accordance with the present invention an embodiment of a guiding attachment for use in combination with a cutting torch is described. The cutting torch includes a nozzle which has a truncated conical tip portion and a cylindrical portion, an elongated member mechanically coupled to the nozzle and a gas supplying device for supplying gas to the nozzle which is mechanically coupled to the elongated member and a handle which is mechanically coupled to the elongated member. The guiding attachment includes a cylindrical member which has a bore into which the nozzle is placed and a pair of metal axial rods which are mechanically coupled to the cylindrical body. The guiding attachment also includes a pair of metal wheels, each of which is rotatably coupled to one of the metal axial rods and a coupling device which is a wing nut which is threadedly coupled to the cylindrical member and which couples the cylindrical portion of the nozzle of the cutting torch to the cylindrical member.

The features of the present invention which are believed to be novel are set forth with particularity in the appended claims.

Other claims and many of the attendant advantages will be more readily appreciated as the same becomes better understood by reference to the following detailed

DESCRIPTION OF THE PREFERRED EMBODIMENT

Figure 1:
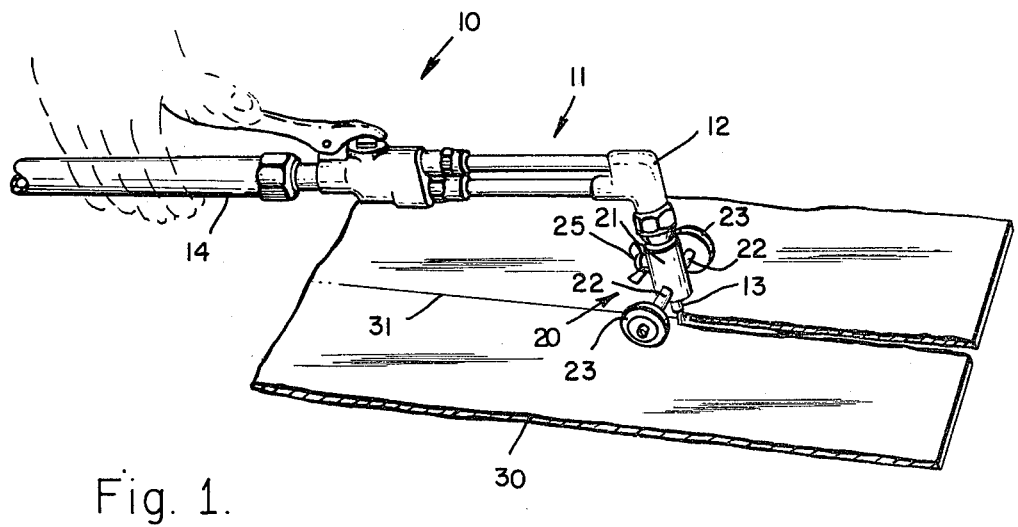
FIG. 1 is a perspective view of a cutting torch in combination with a guiding attachment which has constructed in accordance with the present invention.

In order to best understand the present invention it is necessary to refer to the following description of its preferred embodiment in conjunction with the accompanying drawing. Referring to FIG. 1 a combination of a cutting torch 11, which includes a nozzle 12 which has a truncated conical tip portion 13 and a cylindrical portion 26, an elongated member mechanically coupled to the nozzle and a gas suppying device 14 for supplying gas to the nozzle 12 which is mechanically coupled to the elongated member and a handle which is mechanically coupled to the elongated member, and a guiding attachment 20.

The guiding attachment 20 includes a cylindrical member 21 which has a bore into which the nozzle 12 is placed and a pair of metal axial rods 22 which are mechanically coupled to the cylindrical body. The guiding attachment 20 also includes a pair of metal wheels 23, each of which is rotatably coupled to one of the metal axial rods 22 and is secured by a screw and a washer combination 24 to the end of each metal axial rod 22. A wing nut 25 which is threadedly coupled to the cylindrical member 21 and which couples the cylinidrical portion 26 of the nozzle 12 of the cutting torch 11 to the cylindrical member 21.

Figure 2:
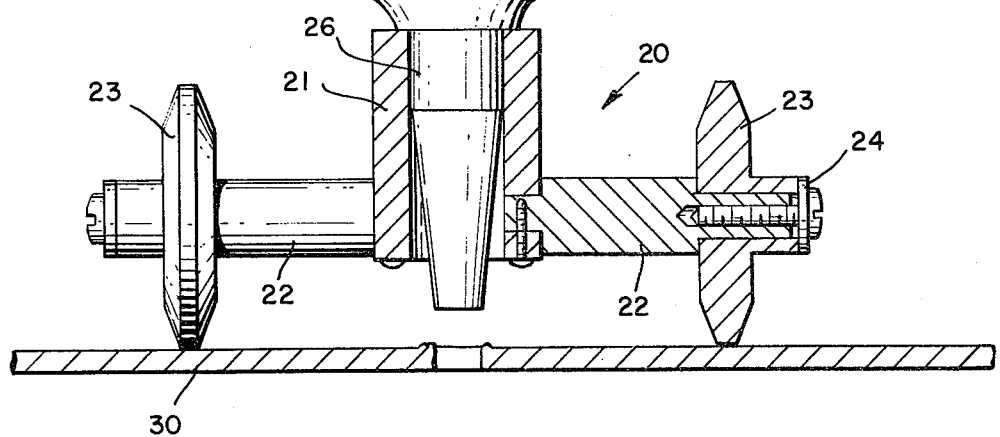
FIG. 2 is a front elevational cross-sectional view of the guiding attachment of FIG. 1.

Referring to FIG. 2 in combination with FIG. 1 the combination 10 of the cutting torch 11 and the guiding attachment 20 is use to cut through a sheet 30 of metal along a drawn line 31 so that the user of the cutting torch 11 needs to use only one hand to guide the flame of the cutting torch 11. The guiding attachment maintains the flame of the 19 cutting torch 11 the proper distance from the sheet 30 of metal.

From the foregoing it can be seen that a guiding attachment for use in combination with a cutting torch has been described. It should be noted that the sketches are not drawn to scale and that distance of and between the figures are not to be considered significant.

Accordingly it is intended that the foregoing disclosure and showing made in the drawing shall be considered only as an illustration of the principles of the present invention.

What is claimed is:

1. A guiding attachment for use in combination with a cutting torch including:
   a. a nozzle having a truncated conical tip portion and a cylindrical portion;
   b. an elongated member mechanically coupled to the nozzle;
   c. gas supplying means for supplying gas to the nozzle mechanically coupled to the elongated member; and
   d. a handle mechanically coupled to the elongated member, said guiding attachment comprising:
      a. a cylindrical member having a bore into which the nozzle is placed;
      b. a pair of metal axial rods mechanically coupled to said cylindrical body;
      b. a pair of metal wheels, each of which is rotatably coupled to one of said metal axial rods; and
      c. coupling means for coupling the cylinidrical portion of the nozzle of the cutting torch to said cylindrical member.

2. A guiding attachment for use in combination with a cutting torch according to claim 1 wherein said coupling means is a wing nut which is threadedly coupled to said cylindrical member and which secures the cylindrical portion of the nozzle to said cylindrical member.

* * * * *